May 26, 1964
R. P. MASSEY ETAL
3,134,940
REGULATED VOLTAGE CONVERTER CIRCUIT
Filed Dec. 29, 1961
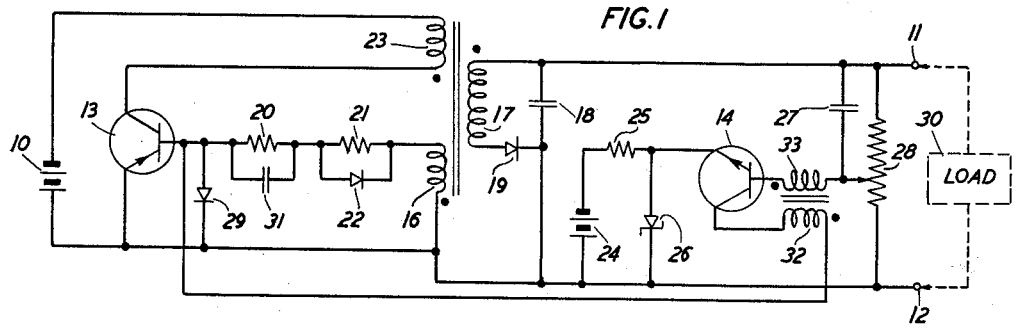
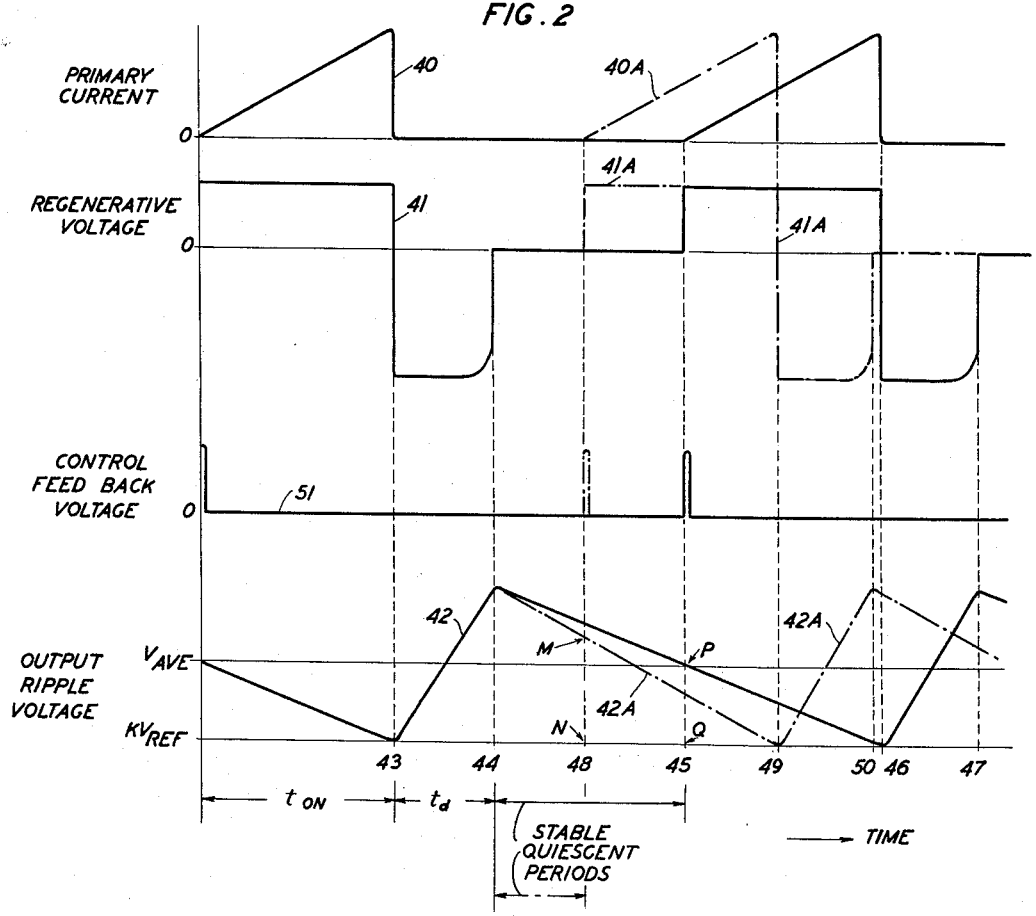
INVENTORS: R. P. MASSEY
R. M. RICKERT
BY Roy M. Porter Jr.
ATTORNEY United States Patent Office 3,134,940
Patented May 26, 1964

3,134,940
REGULATED VOLTAGE CONVERTER CIRCUIT
Richard P. Massey, Westfield, N.J., and Richard M. Rickert, Flushing, N.Y., assignors to Bell Telephone Laboratories, Incorporated, New York, N.Y., a corporation of New York
Filed Dec. 29, 1961, Ser. No. 163,216
2 Claims. (Cl. 321—2)

This invention relates to systems for utilizing an available direct-current voltage to produce a different direct-current voltage and, more particularly, to semi-conductor oscillator systems for producing a change in direct-current voltage level.

In such voltage conversion systems, a switching element is used to produce alternating currents from the available direct-current input voltage. These alternating currents are used to induce alternating voltages in an inductive circuit; then the induced alternating voltages are rectified and filtered to produce a direct-current output voltage.

In the copending application of R. E. D. Anderson and R. J. Projain, Serial No. 159,243, filed December 14, 1961, a voltage converter circuit using a transistor switching device is disclosed. That application introduces a new control concept into the transistor voltage converter field by providing a stable quiescent period of the switching device and its associated inductive circuit and by varying the length of said quiescent period to regulate the output voltage of the converter as the loading and the input voltage fluctuate.

The feedback control circuit of such a converter performs the primary function of timing the termination of the stable quiescent period. That is, a new cycle of high current conduction of the semiconductor switching device is commenced at the proper time to achieve the desired regulation.

In addition to the timing function, another problem which was solved in reducing the invention cited above to practice was the stabilization of the quiescent period by preventing parasitic oscillations from turning the switching transistor on before the time determined by the feedback circuit.

It is an object of this invention to make more efficient use of the feedback control circuit of a voltage converter system utilizing variation of a stable quiescent period to achieve regulation.

A further object of the invention is to increase the accuracy of timing by the feedback control circuit of such a system while reducing power losses therein.

A still further object of the invention is to improve the stabilization of the quiescent period of the voltage converter while reducing power losses in the transistor switching device and its associated inductive circuit.

Accordingly, applicants have recognized that the foregoing objects can be achieved if the error-sensing apparatus of the feedback control system is made regenerative. This is achieved by transformer-coupled positive feedback for the error-detector transistor. The presence of a reference voltage within the input circuit of the error-detector transistor makes the error-sensing apparatus sensitive to output voltage errors within a first range and insensitive to errors within a second range. Thus, a pulse will be produced by the regenerative error-detecting apparatus as the output voltage error signal passes from the range of insensitivity into the range of sensitivity. Furthermore, repetition of the pulse will occur if the output voltage error signal remains in the range of sensitivity longer than a predetermined period of time. The elimination of a continuous error signal significantly reduces power losses.

According to another feature of this invention, stabilization of the quiescent period of the converter circuit is improved by providing a firm reverse bias of the transistor switching device during said quiescent period. This bias is provided by a circuit, preferably a parallel combination of resistance and capacitance in the regenerative feedback path of the semiconductor switching device, which stores energy before the commencement of the quiescent period and then discharges said energy to reverse-bias said device during said quiescent period. The variability of this reverse bias does not affect the timing of the circuit because of the sharpness and height of the pulse generated by the error-sensing apparatus. The introduction of regenerative error-sensing apparatus is thus important to the use of this feature of the invention.

Other objects, features, and advantages of the invention will become apparent from the following detailed description in conjunction with the drawings.

FIG. 1 is a schematic and block diagrammatic illustration of the preferred embodiment of the invention.

FIG. 2 shows curves which are useful in explaining the theory and operation of the invention.

In FIG. 1 input voltage 10 is the available direct-current voltage from which it is desired to obtain a different direct-current voltage at terminals 11 and 12. Transistor 13 has emitter, collector, and base electrodes. The emitter and collector electrodes, primary inductive winding 23 and input voltage 10 are connected in a closed series circuit. The orientation of transistor 13 with respect to input voltage 10 depends upon its conduction type. The emitter and base electrodes, the parallel combination of resistance 20 and capacitor 31, the parallel combination of resistance 21 and diode 22, and regenerative inductive winding 16 are connected in a closed series circuit. Diode 22 is oriented to carry current when transistor 13 is forward-biased, that is, in its low impedance condition. Diode 29 is connected directly from base to emitter of transistor 13 and oriented to conduct when reverse voltages, that is, voltages opposing conduction of transistor 13, are applied to its base-emitter junction.

In the preferred embodiment of FIG. 1, transistor 13 is a PNP junction transistor, but it could equally well be an NPN junction transistor or any other semiconductor amplifying device with at least three electrodes. Its essentials are that it has two terminals, corresponding to the emitter and collector electrodes of transistor 13, between which a high impedance condition and a low impedance condition can be made to appear and that it has two terminals, corresponding to the emitter and base electrodes of transistor 13, between which a feedback voltage or current of a polarity to be regenerative can be connected with regenerative effect. PNP junction transistor 13 has the capability of producing a strongly regenerative effect. A more detailed description of the fabrication and characteristics of transistors may be found in United States Patent 2,569,347, issued September 25, 1951, for the invention of W. Shockley.

There is electromagnetic coupling between primary inductive winding 23 and regenerative inductive winding 16 and output inductive winding 17. The coupling is strengthened by placing all three windings on a ferromagnetic or ferrimagnetic core. The switching action of transistor 13 is made highly regenerative by connecting regenerative winding 16 so that its induced voltage biases the base-emitter junction toward its low impedance condition when the induced voltage of winding 23 opposes input voltage 10. The regenerative action of this loop insures that the transistor 13 will always operate in one of its two most efficient operating modes.

Rectifying junction 19, output inductive winding 17, and filtering capacitor 18 are connected in a closed loop. The output voltage appears across capacitor 18. In the embodiment shown, rectifying junction 19 is oriented to cause the circuit to operate as a ringing-choke converter; rectification occurs only during the period when transistor 13 is in its state of low or no current conduction, that is, turned off. Rectifying junction 19 might also be given the other polarity, in which case the circuit would operate as a transformer-coupled converter. Corresponding changes are suggested hereinafter. For a more detailed description of the development of both branches of the art, see Wolfendale, The Junction Transistor and Its Application, Macmillan, 1958, pp. 321–379.

Voltage divider 28 and load 30 are connected in parallel with capacitor 18 across output terminals 11 and 12.

Transistor 14 has its base or control electrode connected to one terminal of inductive winding 33, and the other terminal of winding 33 is connected to voltage divider 28 in order to sense a selected part of the output voltage. Since the emitter of transistor 14 is connected to the anode of Zener diode 26, which is energized by battery voltage 24 in series with resistor 25 and which has its cathode connected to terminal 12, the resulting collector current of transistor 14 will be related to the difference between the voltage from the base of transistor 14 to terminal 12 and the reference voltage across Zener diode 26. Capacitor 27 is connected from the base of transistor 14 to output terminal 11 to modify the portion of the output voltage from the base of transistor 14 to terminal 12 in response to the output voltage fluctuation which is not associated with the direct-current voltage comparison in the emitter-base circuit of transistor 14. Its capacitance value and the resistance value between the base of transistor 14 and output terminal 12 are preferably proportioned to constitute a differentiating circuit, as will be more fully described hereinafter.

To complete the feedback control loop from the output circuit to the input circuit, the collector of transistor 14 is connected to one terminal of inductive winding 32; and the other terminal of winding 32 and output terminal 12 are connected to opposite sides of the base-emitter junction of transistor 13 so that the collector current of transistor 14 flows through the base-emitter junction of transistor 13 in a direction to bias transistor 13 toward conduction. Windings 32 and 33 are electromagnetically coupled so that the voltage induced in winding 33 by an increase of current in winding 32 tends to increase the base current of transistor 14.

Since transistor 14 is merely a comparator and actuator combined, its function might be performed by any number of elements designed to give amplification and isolation of the output voltage from the regenerative feedback loop. The voltages to be compared are merely opposed in the input circuit of such elements.

If rectifying junction 19 is reconnected to make the circuit a transformer-coupled circuit, then the relative polarity of voltages in the output circuit will be reversed and this might be compensated for by a number of ways, but one obvious way of making the change in the output circuit is to change the conduction type of transistor 14. Thus, it would become a PNP transistor instead of an NPN transistor. The connections of its collector and terminal 12 to the base-emitter junction of transistor 13 must then be reversed and biasing changes made.

Further, any other means might be used to supply a constant reference voltage instead of battery 24, resistor 25, and Zener diode 26. In particular, battery voltage 24 can be replaced by input voltage 10 by connecting the end of resistor 25 opposite Zener diode 26 to the negative terminal of input voltage source 10.

In operation, the available voltage from source 10 is applied to switching transistor 13 and primary inductive winding 23. The object is to obtain a different well-regulated direct-current voltage at terminals 11 and 12 as switching transistor 13 alternates between high and low impedance states.

After the circuit has been in operation for some time, switching transistor 13 is turned on by the feedback control circuit when the potential of the base electrode of control transistor 14, which is connected to a preselected contact point on voltage divider 28, becomes less negative than the potential of the emitter electrode of control transistor 14, which is the reference voltage across Zener diode 26. Then a base-to-emitter current will flow in transistor 14, thereby lowering its impedance; and a corresponding current will flow from the collector to the emitter terminal of transistor 14, through the Zener diode 26, and back to the collector through the emitter-base junction of switching transistor 13 and inductive winding 32. The increase of current in inductive winding 32 induces a voltage in inductive winding 33 which increases the base current flow of transistor 14, further reducing the emitter-collector impedance of transistor 14 and allowing further increase of the current in winding 32. The inductance of winding 32 is made as small as is allowable for effective regenerative action, with the result that the pulse of current flowing in winding 32 as a result of this regenerative action has an extremely short rise time. It is essentially a square pulse, as illustrated curve 51 of FIG. 2, in comparison to the other circuit waveforms illustrated in FIG. 2. Since this current pulse flows through the base-emitter junction of transistor 13, except for that portion of the pulse which discharges capacitor 31, transistor 13 will be firmly forward-biased immediately to a point where the gain of transistor 13 and its associated regenerative feedback loop exceeds unity. The advantage of a pulse is that transistor 13 almost instantly passes through the range of emitter-to-base voltages for which loop gain is less than unity into a range where the loop gain is greater than unity. As the current in inductive winding 23 increases, a voltage is induced in regenerative feedback winding 16 with a polarity which tends to increase the base current flow of transistor 13. This regenerative action quickly drives the emitter-collector impedance of switching transistor 13 toward its minimum value, and transistor 13 enters a state of operation commonly called saturation. In this state the existing collector current is less than the maximum obtainable collector current for the then-existing value of base current and the loop gain of transistor 13 and its associated regenerative feedback circuit has once again fallen below unity after the brief instant of strongly regenerative action involved in turning on transistor 13.

Experience has shown that current will increase in primary inductive winding 23 in a nearly linear fashion as illustrated in the first portion of curve 40 of FIG. 2. The regenerative feedback voltage will be essentially constant as illustrated in the first portion of curve 41 of FIG. 2. During this portion of the cycle, the polarity of the induced voltage in output inductive winding 17 is such that it is not rectified by rectifying junction 19; and therefore the voltage across filtering capacitor 18, voltage divider 28, and load 30 will continue to decrease as shown in the first portion of curve 42 of FIG. 2. Eventually, the collector current of switching transistor 13 attains the maximum value corresponding to the then-existing base current of transistor 13. It is commonly said that transistor 13 comes out of saturation at this point. Since maximum collector current for that base current has been reached, the current in primary winding 23 can no longer increase at a rate sufficient to maintain an induced voltage in regenerative feedback winding 16 which can sustain the aforesaid base current. At this point, corresponding to time 43 of the curves of FIG. 2, a decrease in the current in primary winding 23 is commenced and a highly regenerative switch-off of transistor 13 results.

The beginning of the collapse of the magnetic field of primary winding 23 reverses the induced voltages in regenerative winding 16 and output winding 17. The voltage of output winding 17 is now a polarity which is rectified by rectifying junction 19. The electromagnetic energy previously stored in the magnetic field is now delivered to filtering capacitor 18 in the output circuit.

The energy now delivered to filtering capacitor 18 should be a very small proportion of the energy stored in its electric field at the immediately preceding instant of time. This proportion determines the percentage output ripple voltage, since the energy storage of a capacitor is proportional to the square of the potential across it. It is readily seen that, since energy must be delivered in bursts, the ripple voltage cannot be entirely eliminated.

However, relative insignificance of the ripple voltage means that filtering capacitor 18 has a pronounced clamping effect on the terminal voltage of output winding 17. The terminal voltage of regenerative feedback winding 16 will be correspondingly flat, as illustrated by the portion of curve 41 between points 43 and 44 in FIG. 2. A rounding off of both curves 41 and 42 occurs at point 44 of FIG. 2 as the stored energy of the magnetic circuit approaches zero.

The invention utilizes the unavoidable ripple voltage to regulate the average value of the direct-current component of the output voltage by providing, and varying the duration of, a stable quiescent state of the inductive circuit, consisting of windings 16, 17, and 23, after the energy delivery to filtering capacitor 18 is complete. During both the energy delivery period and the quiescent period, switching transistor 13 is "off" or in a state of low current conduction. Thus, it might be said that the "off" time of transistor 13 is being controlled, even though part of that "off" time, the energy delivery time, cannot be completely eliminated.

Further explanation of the apportionment of circuit parameters to achieve a stable quiescent state is contained in the above-cited application of Anderson and Projain.

In the above-cited application of Anderson and Projain the stable quiescent state was stabilized by the operation of the equivalent of the parallel combination of resistor 21 and diode 22 and by internal damping of winding 16 approaching critical damping for parasitic oscillations of winding 16. The parallel combination of resistor 21 and diode 22 also has the advantage of reducing resistive heating losses during the active portions of the cycle, as explained in the above-cited application.

This structure is retained in the present invention for the latter reason and the parallel combination of resistor 20 and capacitor 31 is added to perform the stabilization of the quiescent period.

The operation of this new structure may be described as follows. During the period of high current conduction of transistor 13, as, for instance, up until time 43 of FIG. 2, capacitor 31 was building up a charge. At time 43, it begins to discharge, rapidly at first under the influence of the reversed regenerative feedback voltage and then much more slowly after rectification ceases at time 44.

From time 43 until time 45, for the solid line curves of FIG. 2, capacitor 31 provides a sufficient reverse bias for the base-emitter junction of switching transistor 13 to swamp out any parasitic oscillations of regenerative feedback winding 16, a phenomenon more fully explained in the above-cited application of Anderson and Projain. Thus, winding 16 does not need to have high internal damping and in fact may have low internal damping.

A further advantage of this method of stabilizing the quiescent period is that the reverse bias of the base-emitter junction of transistor 13 substantially reduces low level conduction, or leakage, current of transistor 13 during the portions of an oscillation cycle represented by the solid curves of FIG. 2 between times 43 and 45. Power losses in transistor 13 are reduced, and objectionable heating of transistor 13 is reduced.

The operation of capacitor 27 in conjunction with the remainder of the error-sensing portion of the feedback control circuit is fully developed in the above-cited application of Anderson and Projain. In brief, capacitor 27 and the portion of voltage divider 28 between winding 33 and terminal 12 preferably sense the rate of change of the output voltage. In more general terms, they make error-detector transistor 14 more sensitive to the output ripple voltage.

Thus, the duration of the stable quiescent state is varied in response to changes in the requirements of load 30.

The pulsing circuit consisting of transistor 14 and its associated windings 32 and 33 offers still further advantages in the operation of the converter circuit. First, a control feedback signal is produced at the only time a signal is needed, that is, at the time the stable quiescent state should be ended and a new cycle of high current conduction of switching transistor 13 commenced in order to achieve good regulation. The rest of the time transistor 14 is firmly cut off by a ringing action of windings 32 and 33, and, thus, power losses in transistor 14 and its associated circuitry is minimized. Not only is a continuing error signal eliminated, but the low level conduction, or leakage, current of transistor 14 is reduced.

Second, the constancy of the "on" time of switching transistor 13 and of the peak current in primary winding 23 is improved. A more detailed explanation of the preceding terms is given in the above-cited application of Anderson and Projain. Briefly, the "on" time is represented in FIG. 2 by the times between the ordinate and time 43 and between 45 and 46 for curve 42 and between times 48 and 49 for curve 42A. The peak current of primary winding 23 is represented by the peaks of curves 40 and 40A.

In the above-cited application of Anderson and Projain, variation of the "on" time and peak primary winding current were reduced to second order effects. The present invention gives improved constancy because there is no continuing feedback control signal to interfere with the action of regenerative feedback winding 16 during the period of high current conduction of transistor 13. Thus, the output voltage ripple will be more constant and the timing of switching of transistor 13 more precise.

The connection of the feedback control signal output, consisting of the side of winding 32 opposite the collector of transistor 14, and of terminal 12, directly across the base-emitter junction of transistor 13 represents a further improvement. A transistor is basically a current-sensitive device, and the most efficient way of triggering switching transistor 13 is by means of a current pulse. The switching is faster and thus more efficient because of reduced heating in transistor 13.

Because a pulse is used as the feedback control signal, any control signal amplifiers needed can be A.C.-coupled instead of D.C.-coupled. Cheaper design of such amplification stages, less drift, and higher gain are thus all made possible.

As in the above-cited application of Anderson and Projain, the embodiment of FIG. 1 regulates against fluctuations in the input voltage of source 10, as well as against variations in loading. The reference voltage regulation provided by Zener diode 26 makes this possible, even if battery voltage 24 is provided by source 10 itself.

The ranges of input and output voltages which can be accommodated by a single unit are wide enough to indicate use as a low-power universal supply which can maintain a given output voltage regardless of whether the input voltage is above or below that value.

In all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. Direct-current voltage converter apparatus comprising an input to which a direct-current voltage may be applied, an output including a rectifier-filter for producing a load direct-current voltage, and a transistor oscillator connected between said input and said output, said transistor oscillator comprising a power transistor having emitter and collector electrodes connected across said input and having a base electrode, a first transformer having a primary winding connected in series with said power transistor emitter and collector electrodes across said input, said first transformer having a secondary winding connected across said rectifier-filter and a feedback winding connected across said power transistor base and emitter electrodes and oriented for promoting current between said power transistor base and emitter electrodes whenever current in said primary winding is increasing, means connected serially with said feedback winding across said power transistor base and emitter electrodes for preventing parasitic oscillations in said feedback winding from initiating said primary winding current, a comparator transistor having collector, emitter and base electrodes, means for producing a stabilized direct-current reference voltage, said reference voltage producing means being connected across said comparator transistor base and emitter electrodes and oriented for promoting current between said comparator transistor base and emitter electrodes, an output voltage sensing circuit connected across said output and having at least a portion connected in series with said reference voltage producing means across said comparator transistor base and emitter electrodes for opposing said reference voltage by a decreasing amount as said load voltage decreases, and a second transformer having a primary winding connected serially with said portion of said output voltage sensing circuit and said reference voltage producing means between said comparator transistor base and emitter electrodes, said second transformer having a secondary winding connected serially with said comparator transistor emitter and collector electrodes across the base and emitter electrodes of said power transistor and oriented for starting current through said power transistor base and emitter electrodes whenever current through said second transformer primary winding starts to increase.

2. Direct-current voltage converter apparatus comprising an input to which a direct-current voltage may be applied, an output including a rectifier-filter for producing a load direct-current voltage, and a transistor oscillator connected between said input and said output, said transistor oscillator comprising a power transistor having emitter and collector electrodes connected across said input and having a base electrode connected in a closed loop with said emitter electrode, a first transformer having a primary winding connected in series with said power transistor emitter and collector electrodes across said input, said first transformer having a secondary winding connected across said rectifier-filter and a feedback winding connected serially in said closed loop and oriented for promoting power transistor base current when current in said first transformer primary winding is increasing, a capacitor connected serially with said feedback winding in said closed loop for preventing parasitic oscillations in said feedback winding from initiating said first transformer primary winding current, a comparator transistor having collector, emitter and base electrodes, a source of a direct-current reference voltage connected across said comparator transistor base and emitter electrodes and oriented for promoting conduction between said comparator transistor base and emitter electrodes, an output voltage sensing circuit connected across said output, said sensing circuit having at least a portion connected in series with said reference voltage source across said comparator transistor base and emitter electrodes for opposing said reference voltage by a decreasing amount as said load voltage decreases, and a second transformer having a primary winding connected serially with said portion of said output voltage sensing circuit and said reference voltage source between said comparator transistor base and emitter electrodes, said second transformer having a secondary winding connected serially with said comparator transistor emitter and collector electrodes and said reference voltage source across said power transistor base and emitter electrodes and oriented for impressing across said power transistor base and emitter electrodes a pulse that starts said power transistor base current whenever current through said second transformer primary winding starts to increase despite simultaneous discharging of said capacitor.

References Cited in the file of this patent

UNITED STATES PATENTS

| | | |
|---|---|---|
| 2,791,739 | Light | May 7, 1957 |
| 2,886,706 | Roger | May 12, 1959 |
| 2,898,557 | Dahlin | Aug. 4, 1959 |
| 3,005,961 | Wallace | Oct. 24, 1961 |
| 3,056,930 | Berg | Oct. 2, 1962 |